United States Patent
Kokami

(10) Patent No.: US 7,054,089 B2
(45) Date of Patent: May 30, 2006

(54) MAGNETIC DISK STORAGE SYSTEM

(75) Inventor: Yasuhiko Kokami, Takasaki (JP)

(73) Assignees: Renesas Technology Corp., Tokyo (JP); Hitachi ULSI Systems Co., Ltd., Tokyo (JP)

(*) Notice: Subject to any disclaimer, the term of this patent is extended or adjusted under 35 U.S.C. 154(b) by 85 days.

(21) Appl. No.: 10/691,612

(22) Filed: Oct. 24, 2003

(65) Prior Publication Data
US 2004/0100722 A1 May 27, 2004

(30) Foreign Application Priority Data
Nov. 25, 2002 (JP) ............... 2002-340338

(51) Int. Cl.
G11B 15/46 (2006.01)
(52) U.S. Cl. .................. 360/73.03; 360/70; 360/75
(58) Field of Classification Search .............. 360/69, 360/71, 73.01, 73.02, 73.03, 75
See application file for complete search history.

(56) References Cited

U.S. PATENT DOCUMENTS 5,455,496 A    10/1995  Williams et al.
5,754,355 A *   5/1998  Nakamura et al. ....... 360/73.03
6,243,222 B1*   6/2001  Boutaghou et al. ...... 360/73.03
6,285,521 B1*   9/2001  Hussein ................... 360/73.03
6,396,652 B1*   5/2002  Kawachi et al. ............. 360/75

FOREIGN PATENT DOCUMENTS

JP          7-14331          5/1994

* cited by examiner

Primary Examiner—David Hudspeth
Assistant Examiner—Jason Olson
(74) Attorney, Agent, or Firm—Reed Smith LLP; Stanley P. Fisher, Esq.; Juan Carlos A. Marquez, Esq.

(57) ABSTRACT

The present invention provides a magnetic disk storage system including a spindle motor that rotates a magnetic disk, a spindle motor drive circuit that rotatably drives the spindle motor, a magnetic head that performs reading of information on the magnetic disk, a voice coil motor that moves the magnetic head, and a voice coil motor drive circuit that drives the voice coil motor. When the magnetic head is loaded from a standby position to the surface of the magnetic disk, the rotational speed of the spindle motor is made slower than a rotational speed at a normal operation. Upon power-off, the spindle motor drive circuit is caused to carry out a stepup converter operation to thereby generate a voltage higher than a back electromotive voltage, and causes a control circuit and a drive circuit to operate by the high voltage to thereby enable speed control at the movement of the magnetic head to a predetermined standby position.

18 Claims, 9 Drawing Sheets

MAGNETIC DISK STORAGE SYSTEM

BACKGROUND OF THE INVENTION

The present invention relates to a control technology of a magnetic disk storage system, and a technology effective when applied to motor control at the time of shut-off of a power supply like the time of the occurrence of power failure, e.g., a technology effective for use in retraction control of a magnetic head by a voice coil motor for moving the magnetic head that effects read/write of information on a storage track on a magnetic disk in a hard disk drive.

A magnetic disk storage system includes a voice coil motor for moving (seek-operating) a magnetic head that effects read/write of information on a storage track on a magnetic disk, in a radial direction along the surface of the magnetic disk in addition to a spindle motor for rotatably driving the magnetic disk. In a hard disk drive, the magnetic head is configured so as to glide on the surface of the disk with wind pressure developed with the rotation of the disk. Thus, there is a possibility that when the rotation of the disk is stopped, the magnetic head will come into contact with the disk surface to thereby make flaws thereon. There is further a possibility that when the disk surface is brought to a mirror state with an advance in high density of magnetic recording, the stopped head will be absorbed at the disk surface to thereby block the rotation of the disk.

Thus, when the rotation of the disk is stopped, the operation (called unloading in the present specification) of retracting the magnetic head to a support table called a ramp placed in a standby position lying outside the disk is performed. On the other hand, it is necessary to move (load) the magnetic head from the ramp position onto the disk at the seek start of the head. At this time, there is a possibility that when the speed of travelling of the magnetic head by the voice coil motor extremely increases, the magnetic head will make contact with the disk surface to thereby damage it. Therefore, it has generally heretofore been practiced to monitor a back electromotive voltage of the voice coil motor and control the travelling speed of the magnetic head.

The hard disk drive needs to retract the magnetic head as a matter of course even upon the occurrence of power failure from the reason similar to the necessity of retracting the magnetic head to the ramp placed outside the disk when the rotation of the disk is stopped. Since, however, a power supply for a control circuit of the voice coil motor is also shut off upon the occurrence of the power failure, it becomes unfeasible to drive and control the voice coil motor.

Thus, there has been proposed the invention wherein a retracting driver (hereinafter referred to as a retract driver) is provided aside from a driver (hereinafter called a VCM driver) for driving a voice coil motor for head seeking, and the retract driver is operated by a voltage obtained by rectifying a back electromotive force of a spindle motor upon the occurrence of power failure (see Patent document 1).

[Patent Document 1]

Japanese Unexamined Patent Publication No. Hei 7(1995)-14331.

SUMMARY OF THE INVENTION

However, when the retract driver is activated by the voltage obtained by rectifying the back electromotive force of the spindle motor, the voltage obtained by simply rectifying the back electromotive force of the spindle motor by diode bridge causes a voltage drop corresponding to a forward voltage of each diode. Therefore, the retract driver cannot be sufficiently activated in the case of a small-sized motor in which the back electromotive force of a spindle motor is small, and when the rotation of the spindle motor is slow.

While a great increase in capacity with high densification has recently been put forward in the magnetic disk storage system, the surface of the magnetic disk is finished to a state of having a very little roughness like a mirror surface with the high densification. Since it becomes necessary to accurately control a head position with the high densification, an attempt has been made to reduce a gap between the magnetic head and the magnetic disk and improve an S/N ratio of a read/write signal. A mechanism called a vacuum slider in which the gap becomes small as the number of rotations of the disk increases, is being put to use to reduce the gap between the magnetic head and the magnetic disk.

There is a possibility that when such a vacuum slider is used, the head will collide with the disk surface when the rotational speed is fast upon moving the head from the standby position to the surface of the magnetic disk. Therefore, a system for loading the magnetic head in a state in which the number of rotations has been reduced lower than at the normal operation, was examined. Since, however, the power failure abruptly occurs, it might be produced during loading. Therefore, when the power failure occurs during loading under the system for making slow the rotational speed of the disk upon loading the magnetic head, the back electromotive force of the spindle motor is not so sufficient that it becomes difficult to move the magnetic head to the standby position in safety.

The power failure might occur when the head is being moved to the outside of the disk during a seek operation. Also the power failure might occur when the head is being moved to the inside of the disk. When the power failure occurs when the head is being moved to the inside of the disk, it is necessary to reduce the speed of the magnetic head and supply such a large driving force as to allow the head to be moved in a reverse direction, to the voice coil motor. On the other hand, when the power failure occurs when the magnetic head is being moved to the outside of the disk, a brake is applied to the motor and the head must be controlled so as not to collide with the ramp. Therefore, there is a need to carry out complex and high-accuracy control. However, it became evident that a problem arose in that since the conventional retract operation made use of the voltage obtained by simply rectifying the back electromotive voltage of the spindle motor, the resultant voltage was low and only simple control of such an extent that the driver of the voice coil motor was driven to retract the head, could be performed.

An object of the present invention is to provide a control technology of a voice coil motor, which is capable of reliably retracting a magnetic head upon shutoff of a power supply in a magnetic disk storage system.

Another object of the present invention is to provide a control technology of a voice coil motor, which is capable of moving a magnetic head to a standby position safely even if a power supply is shut off when the rotation of a spindle motor is slow, in a magnetic disk storage system.

A further object of the present invention is to provide a control technology of a voice coil motor, which is capable of moving a magnetic head to a standby position in safety even when a power supply is shut off during loading of the magnetic head, in a magnetic disk storage system wherein the loading of the magnetic head is performed in a state in which the number of rotations is reduced lower than at a normal operation.

A still further object of the present invention is to provide a control technology of a voice coil motor, which is capable of safely performing loading and unloading of a magnetic head in a magnetic disk storage system capable of high-density recording using a vacuum slider.

The above, other objects and features of the present invention will become apparent from the description of the present specification and the accompanying drawings.

A summary of a representative one of the inventions disclosed in the present application will be explained in brief as follows:

There is provided a magnetic disk storage system comprising a first motor like a spindle motor which rotates a magnetic disk, a first motor drive circuit which rotatably drives the first motor, a magnetic head which effects read of information on a storage track on the magnetic disk rotated by the first motor, a second motor like a voice coil motor which moves the magnetic head over the magnetic disk, a second motor drive circuit which rotatably drives the second motor, and a drive control circuit which controls currents caused to flow through coils of the first and second motors by the first motor drive circuit and the second motor drive circuit, wherein, upon loading the magnetic head from a standby position to the surface of the magnetic disk, a rotational speed of the first motor is made slower than a rotational speed at a normal operation. Thus, it is possible to avoid that the head is brought into contact with the disk surface upon loading of the magnetic head.

Preferably, the drive control circuit causes the first motor drive circuit to perform a stepup converter operation upon power shutoff to thereby generate a voltage higher than each of back electromotive voltages of the first motor, and moves the magnetic head to a predetermined standby position by the high voltage. Thus, even if power shut-off occurs during the loading of the magnetic head, the magnetic head can be retracted safely. Since the first motor drive circuit is caused to perform the stepup converter operation to thereby generate the voltage higher than the back electromotive voltage, the voltage necessary for a retract operation of the head can be obtained without providing a special stepup converter, and hence an increase in circuit scale can be avoided. Further, the control and drive device dedicated for head retraction also become unnecessary.

DETAILED DESCRIPTION OF THE PREFERRED EMBODIMENTS

Preferred embodiments of the present invention will hereinafter be described with reference to the accompanying drawings.

Figure 1:
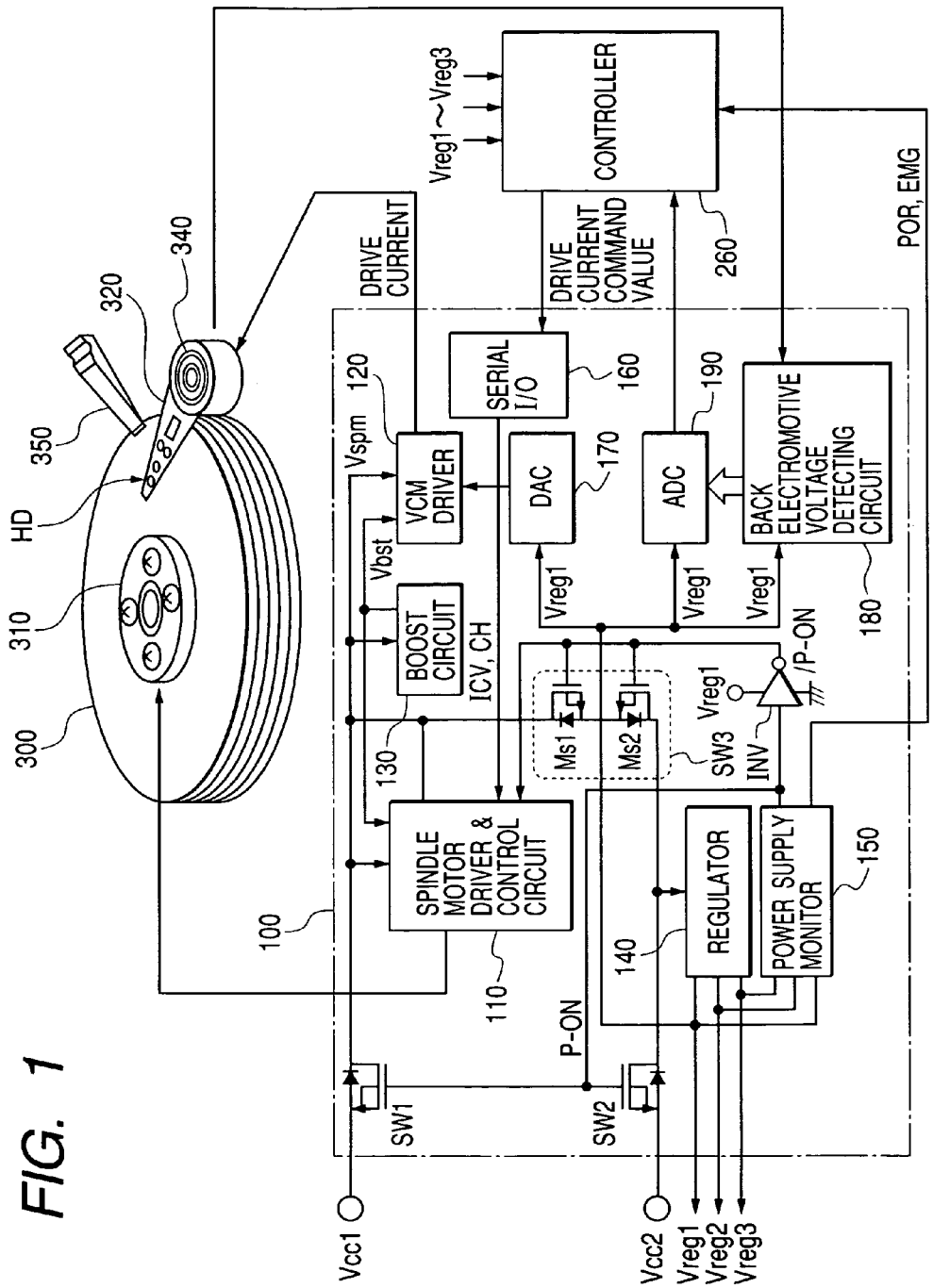
FIG. 1 is a block diagram showing a schematic configuration of a motor control system employed in a magnetic disk storage system to which the present invention is applied.

FIG. 1 shows a schematic configuration of a motor control system employed in a magnetic disk storage system to which the present invention is applied.

As shown in FIG. 1, the magnetic disk storage system according to the present embodiment includes a magnetic disk 300, a spindle motor 310 which rotatably drives the magnetic disk 300 at high speed, an arm 320 having, at its leading end, a magnetic head HD which effects read/write of information on a storage track on the magnetic disk 300, a voice coil motor 340 which moves the magnetic head HD over the magnetic disk 300 via the arm, a motor drive control circuit 100 brought into semiconductor integrated circuit form, which drives and controls the voice coil motor 340, a controller 260 which controls the operation of the whole magnetic disk storage system and outputs a current command value for the voice coil motor and a current command value for the spindle motor, etc. Reference numeral 350 indicates a ramp which is disposed outside the magnetic disk 300 and supports the arm 320 upon stop of rotation of the disk.

The controller 260 is made up of a microcomputer (CPU) or the like. The drive current command values outputted from the controller 260 are supplied to the motor drive circuit 100. The drive current command values include one related to control of the spindle motor 310 and one related to control of the voice coil motor 340. The spindle motor 310 and the voice coil motor 340 are respectively individually driven and controlled. Although not shown in FIG. 1, there is additionally provided a signal processing IC which drives the magnetic head HD to effect writing on the magnetic disk 300 and detect positional information, based on a read signal.

The motor drive control circuit 100 is provided therewithin with a spindle motor driver & control circuit 110, a VCM driver 120, a boost circuit 130 which boosts or steps up a power supply voltage Vcc1 for the driver, like 12V, a voltage regulator 140 which converts a power supply voltage Vcc2 for IC, like 5V to thereby generate internal power supply voltages Vreg1, Vreg2 and Vreg3 such as 3.4V, a power supply monitor 150 which monitors the voltages generated by the voltage regulator 140 to detect the occurrence of power failure, a serial I/O (input/output port) 160 which receives control information such as the drive current command values, each of which is represented in digital data form, a D/A converter 170 which converts each received drive current command value into a drive current command value represented in analog form, a back electromotive voltage detecting circuit 180 which detects a back electromotive force or voltage of the voice coil motor 340, an A/D converter 190 which converts the detected voltage value into a digital value and outputs it to the controller 260 as information about the velocity of the head, etc.

Also the motor drive control circuit 100 is provided with MOSFETs Qs1 and Qs2 which constitute a power supply switch SW1 for transferring the power supply voltage Vcc1 to the motor driver and shutting off it, a power supply switch SW2 for transferring the power supply voltage Vcc2 to the regulator 140 and shutting off it, and a switch SW3 for supplying a voltage obtained by rectifying a back electromotive voltage of the spindle motor to the regulator 140 and shutting off it upon power shutoff. Of these, the power supply switches SW1 and SW2 are respectively on/off-controlled by a power on detect signal P-ON indicative of the rising edge of an internal voltage outputted from the power supply monitor 150.

On the other hand, the switch SW3 is on/off-controlled by the output of an inverter INV for inverting the power on detect signal P-ON. Since the inverter INV is operated at the internal voltage Vreg1 generated by the regulator 140, the inverter INV outputs a signal opposite in phase to the power on detect signal P-ON only during a period T1+T2 in which the internal voltage Vreg1 is rising. The switch SW3 is made up of MOSFETs Ms1 and Ms2 to avoid the flowing of current through body diodes of the MOSFETs. The body diodes of Ms1 and Ms2 are respectively set so as to become backward diodes.

On the other hand, when body diodes are positively used so that the power supply voltages Vcc1 and Vcc2 reach a predetermined level or more, the power supply switches SW1 and SW2 for supplying the power supply voltages Vcc1 and Vcc2 serve so as to allow currents to flow into the internal circuits. That is why a power supply voltage Vspn for the driver rises substantially in synchronism with the rising edge of the power supply voltage Vcc1 at a timing t1 shown in FIG. 3. The boost circuit 130 is provided to bring up or boost each of gate terminals of coil driving transistors of the driver circuits 110 and 120 to a voltage higher than Vspn to thereby bring them to a sufficient on state.

Figure 2:
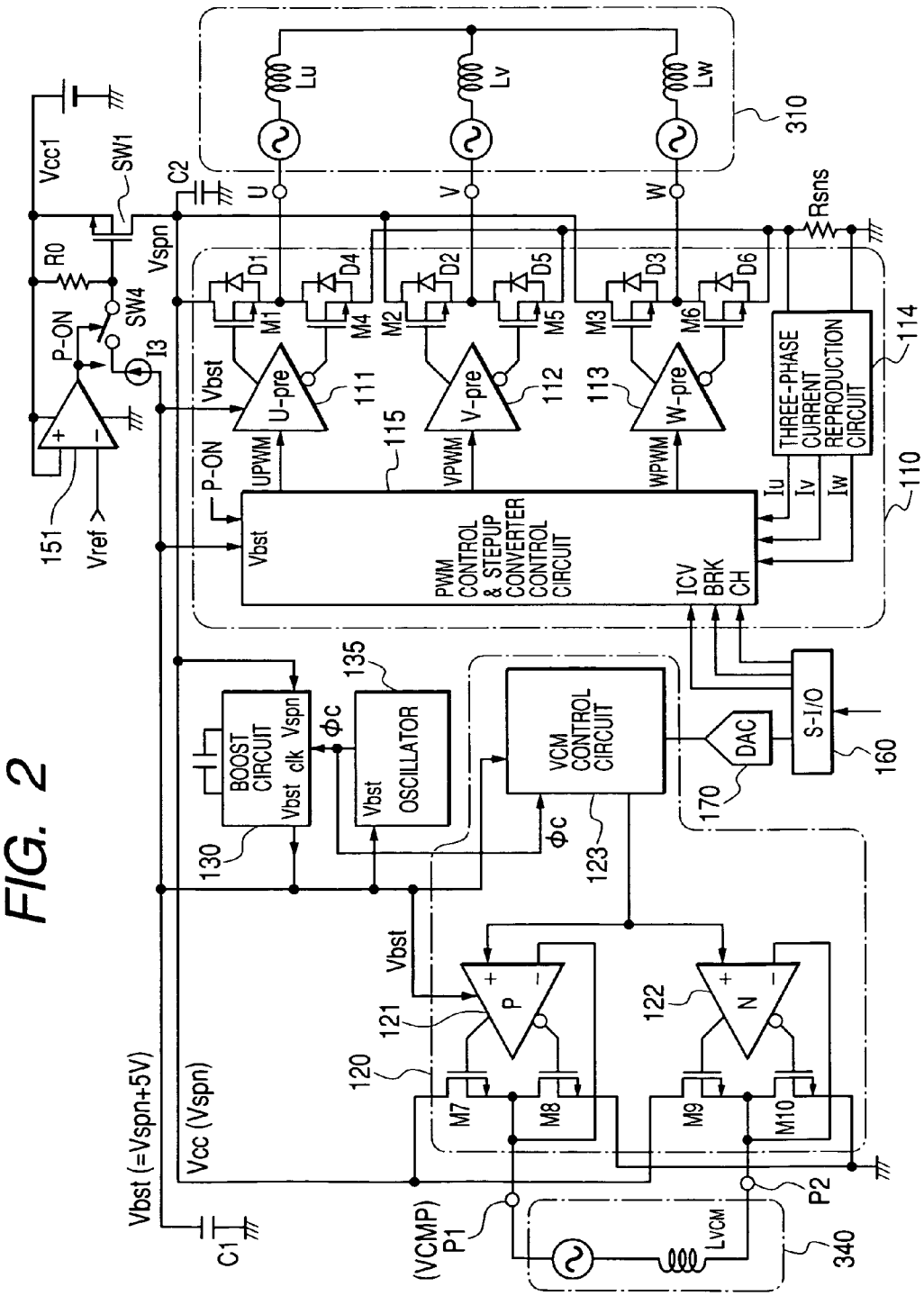
FIG. 2 is a block diagram illustrating more detailed configurational examples of principal parts of a motor drive control circuit employed in the magnetic disk storage system shown in FIG. 1.

FIG. 2 shows more detailed configurational examples of essential or principal parts of the motor drive control circuit 100 employed in the magnetic disk storage system shown in FIG. 1. The regulator 140, power supply monitor 150, back electromotive voltage detecting circuit 180 and A/D converter 190 shown in FIG. 1 are not illustrated in FIG. 2.

Referring to FIG. 2, LVCM is a drive coil for the voice coil motor 340 for moving the magnetic head over the magnetic disk. The VCM driver 120 allows a current corresponding to the output of the D/A converter 170 to flow through the coil LVCM to thereby drive the voice coil motor. The VCM driver 120 comprises N channel type power MOSFETs M7, M8, M9 and M10 connected to connecting terminals P1 and P2 of the coil LVCM to allow the current to flow through the coil, a pair of coil drive amplifiers 121 and 122 which control gate voltages of these power MOSFETs M7, M8, M9 and M10, and a VCM control circuit 123 which generates signals to be inputted to the coil drive amplifiers 121 and 122 in accordance with the output value of the D/A converter 170 which converts the current command value sent from the controller 260 into the analog signal. Thus, such a current so as to coincide with the drive current command value inputted to the D/A converter 170 is caused to flow through the coil LVCM.

The boost circuit 130 comprises a stepup circuit like, for example, a charge pump. The boost circuit 130 is operated at a voltage Vspn obtained by rectifying the power supply voltage Vcc1 upon the normal operation or rectifying each back electromotive force of the spindle motor 310 upon the occurrence of power failure to thereby generate a boost voltage Vbst boosted up to a level set higher by about 5V than Vspn. Reference numeral 135 indicates an oscillator which generates an operation clock φc for the boost circuit 130. Incidentally, in the present specification, the normal operation includes a seek operation for fixing the magnetic head to a desired track position and a seek operation for moving the magnetic head to a desired track position.

The boost voltage Vbst stepped up by the boost circuit 130 is stored in a smoothing capacitor C1. The stored boost voltage Vbst is supplied, as a power supply voltage, to the coil drive amplifiers 121 and 122 for controlling the gate voltages of the power MOSFETs M7, M8, M9 and M10 that allow the current to flow through the coil of the voice coil motor 340 upon the occurrence of power failure. Therefore, even if the power MOSFETs M7, M8, M9 and M10 are constituted by N channel type MOSFETs, it is possible to sufficiently turn them on and hence retract the magnetic head. The N channel type MOSFETs are used as the power MOSFETs M7, M8, M9 and M10 because a reduction in chip size can be achieved as compared with the case in which they make use of P channel type MOSFETs.

In the present embodiment, the oscillator 135 is also configured so as to be operated by the boost voltage Vbst boosted by the boost circuit 130. While the oscillator 135 can also be operated by the back electromotive force of the spindle motor upon the occurrence of power failure in a manner similar to the boost circuit 130, the oscillator 135 is able to avoid the stop of its oscillating operation due to the temporary absence of the voltage by use of the boost voltage Vbst when the power supply voltage Vcc is switched to the back electromotive force Vspn upon the occurrence of power failure. Since the oscillator 135 can be constituted by the known circuit such as a ring oscillator, the illustration and description of its specific circuit will be omitted.

Referring also to FIG. 2, reference numeral 151 indicates a comparator which constitutes the power supply monitor 150, and symbol SW4 indicates a switch on/off-controlled by the output of the comparator 151. The comparator 151 is operated with the power supply voltage Vcc1 as a power supply. The power supply voltage Vcc1 is applied to a non-inversion input terminal of the comparator 151 and a reference voltage Vref is applied to an inversion input terminal thereof. During a period in which the power supply voltage Vcc1 is being supplied, the output P-ON of the comparator 151 is brought to high impedance so that the power supply switch SW1 is brought to an on state by a voltage corresponding to a voltage obtained by multiplying R0 by I3. When the power supply voltage Vcc1 is shut off, the output P-ON of the comparator 151 is changed to a low level to turn SW4 off, so that the power supply switch SW1 is brought to an off state. The power switch SW1 is turned off to prevent the reverse flow of the back electromotive force of the spindle motor 310 into the power supply Vcc1 side. As the power supply of the comparator 151, may be used the boost voltage Vbst stepped up by the boost circuit 130.

Lu, Lv and Lw indicate coils of the spindle motor for rotatably driving the magnetic disk. Although not restricted in particular, a three-phase brushless motor is used as the spindle motor in the present embodiment. The spindle driver circuit 110 comprises output transistors M1, M2, M3, M4, M5 and M6 respectively connected among connecting terminals of the coils Lu, Lv and Lw, power supply voltage terminals and a ground terminal, pre-amplifiers 111, 112 and 113 which respectively on/off-control these output transistors M1 through M6 to allow currents to flow into the coils Lu, Lv and Lw in turn, a sense resistor (shunt resistor) Rsns which detects each of currents that flow from the power supply to the ground point via the coils of the motor, a three-phase current reproduction circuit 114 which reproduces the currents that flow through the coils for respective phases, from voltages corresponding to the currents detected by the sense resistor Rsns, and a control circuit 115 which determines the corresponding phase coil through which the current flows, based on the reproduced current of each phase coil. The currents are supplied to the respective coils of the spindle motor to rotatably drive the motor. The control circuit 115 controls the currents supplied to the coils in a PWM (Pulse Width Modulation) mode upon the normal operation to thereby rotatably drive the motor.

In the present embodiment, the output transistors M1 through M6 are respectively constituted by the N channel type MOSFETs. Upon power shutdown, body diodes D1 through D6 made parasitic between the sources and drains of the output transistors are operated as rectifying circuits that rectify back electromotive forces or voltages developed in the coils Lu, Lv and Lw of the spindle motor and supply power to the driver circuit 110 of the spindle motor and the boost circuit 130.

Further, in the present embodiment, the control circuit 115 apples voltages which are in phase with the back electromotive voltages developed in the respective phases and have amplitudes smaller than those of the back electromotive voltages, to the respective coils of the spindle motor 110 upon power shutoff to allow the currents flowing through the phases to be antiphase with the back electromotive voltages, thereby causing the spindle motor 310 to operate as a stepup converter to perform control for generating a voltage higher than each of the voltages rectified by the body diodes D1 through D6. The voltage Vspn boosted by the stepup converter is stored in and smoothed by a smoothing capacitor C2.

The spindle motor 310 is activated as the stepup converter in this way to thereby generate the voltages necessary for the motor drive control circuit 100 and the controller 260 even when the back electromotive voltages of the spindle motor 310 are small, i.e., the rotational speed of the spindle motor 310 is slow, thus making it possible to drive and control the voice coil motor 340 by the generated voltages and thereby allow the magnetic head to perform its retracting operation reliably and safely. The voltage boosted by the boost circuit 130 is supplied even to the spindle driver circuit 110 for driving the spindle motor 310. Thus, even if the output MOSFETs M1 through M6 are made up of the N channel type MOSFETs, they can be sufficiently turned on to make it possible to prevent the voltages applied to the coils Lu, Lv and Lw from being reduced.

Figure 3:
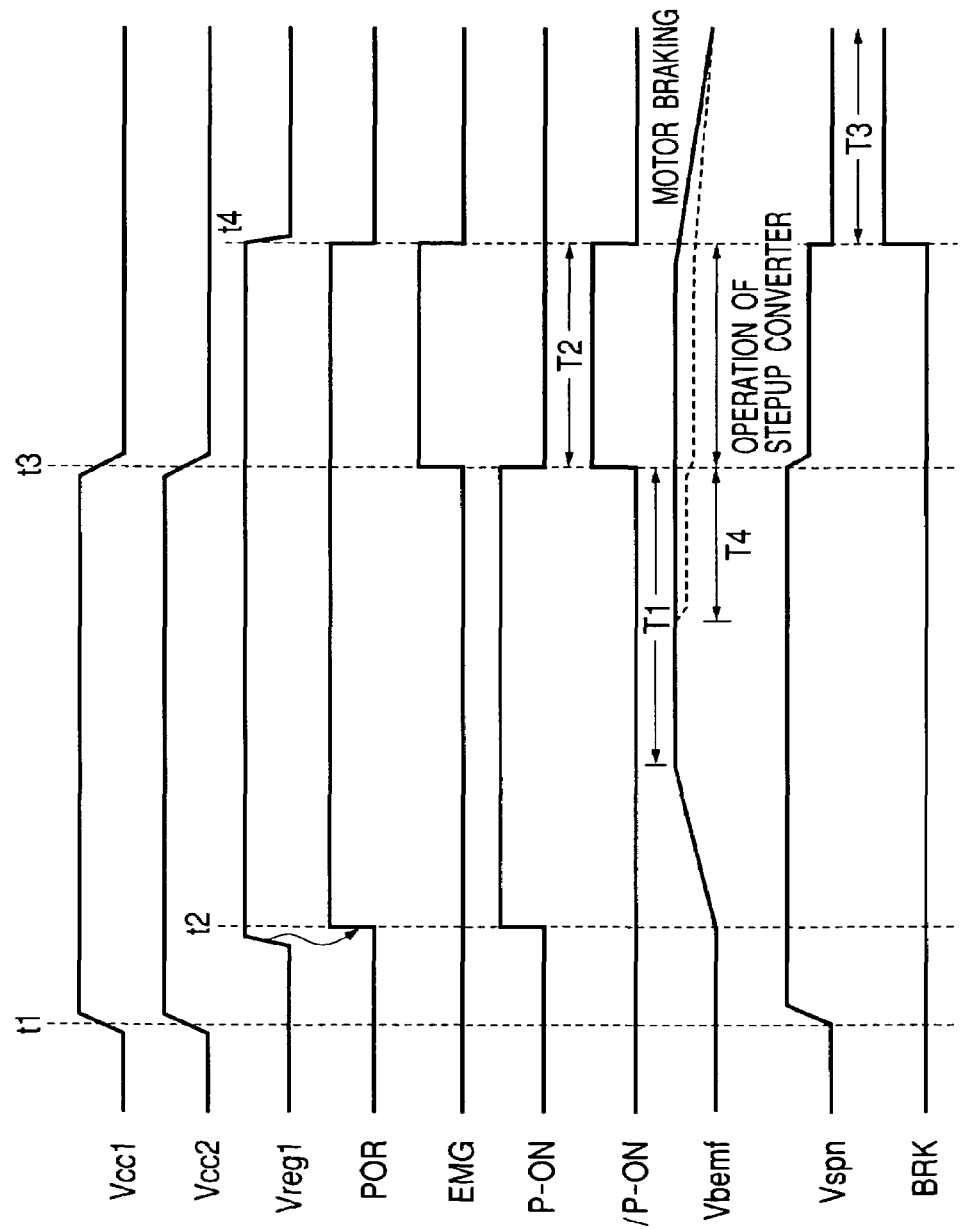
FIG. 3 is a timing chart depicting timings for signals of respective parts under withdrawal control of a magnetic head at the occurrence of power failure by the motor drive control circuit employed in the embodiment.

The timings for the respective signals from the occurrence of power-on to power-down of the magnetic disk storage system according to the present embodiment to the stop of the spindle motor are shown in FIG. 3. When the power supply voltages Vcc1 and Vcc2 rise at the timing t1 and the internal power supply voltage Vre1 generated by the regulator 140 rises at the timing t2, a signal POR indicative of the rising edge of the power supply supplied from the power supply monitor 150 to the controller 260 is changed to a high level. In doing so, a current command value is transmitted from the controller 260 to the motor drive control circuit 100 so that the rotation and driving of the spindle motor 310 is started. When the number of revolutions of the spindle motor 310 reaches a predetermined number of revolutions, the spindle motor 310 is brought to a steady rotating state, so that a back electromotive force Vbemf is held constant (period T1).

Thereafter when the power shutdown occurs at the timing t3, a signal EMG indicative of the occurrence of emergency, which is supplied from the power supply monitor 150 to the controller 260, is changed to a high level. In doing so, the controller 260 changes the current command value supplied to the motor drive control circuit 100 to thereby perform switching to the control of the motor drive control circuit 100 so as to cause the spindle motor 310 to operate as the stepup converter. A signal P-ON indicative of the rising edge of the power supply outputted from the power supply monitor 150 is changed to a low level and /P-ON is change to a high level.

Thus, the power supply switches SW1 and SW2 are turned off, so that the voltage obtained by rectifying the back electromotive voltage Vbemf of the spindle motor 310 is supplied to the regulator 140. The regulator 140 continues to generate the internal power supplies Vreg1 through Vreg3, which are supplied even to the controller 260. The controller 260 is activated by the internal power supplies to supply a current command value to the voice coil motor driver 120, thereby making it possible to retract the magnetic head to a ramp position lying outside the disk (period T2). When the magnetic head reaches the ramp at the timing t4, the controller 260 detects it to stop the output of the current command value to the spindle driver circuit 110, thereby completing a stepup converter operation, and sends a brake signal BRK for stopping the rotation of the spindle motor to deactivate the motor (period T3).

Since the spindle motor is caused to carry out the stepup converter operation to boost the back electromotive voltage in the present embodiment, the magnetic head can be unloaded in safety even if the power shutdown occurs when the number of revolutions of the spindle motor is lowering upon loading of the magnetic head from the ramp onto the disk. That is, since the back electromotive force Vbemf is lowered as indicated by a broken line at the timing t4 of FIG. 3 when the number of revolutions of the motor is reduced in the control system of the conventional spindle motor, the level of the power supply to each of the voice coil motor driver 120 and the controller 260 is reduced when the power shutdown occurs. Therefore, the voice coil motor driver 120 and the controller 260 cannot be used as they are. Consequently, there was a possibility that it would not be possible to control the velocity of the magnetic head with high accuracy and retract the magnetic head safely. However, the present embodiment is applied to allow the spindle motor to execute the stepup converter operation for boosting the back electromotive voltage. Thus, even if the power shutdown occurs when the number of revolutions of the spindle motor is being lowered upon loading the head, the magnetic head can be unloaded safely.

The stepup converter operation of the spindle motor 310 will next be described.

Figure 4:
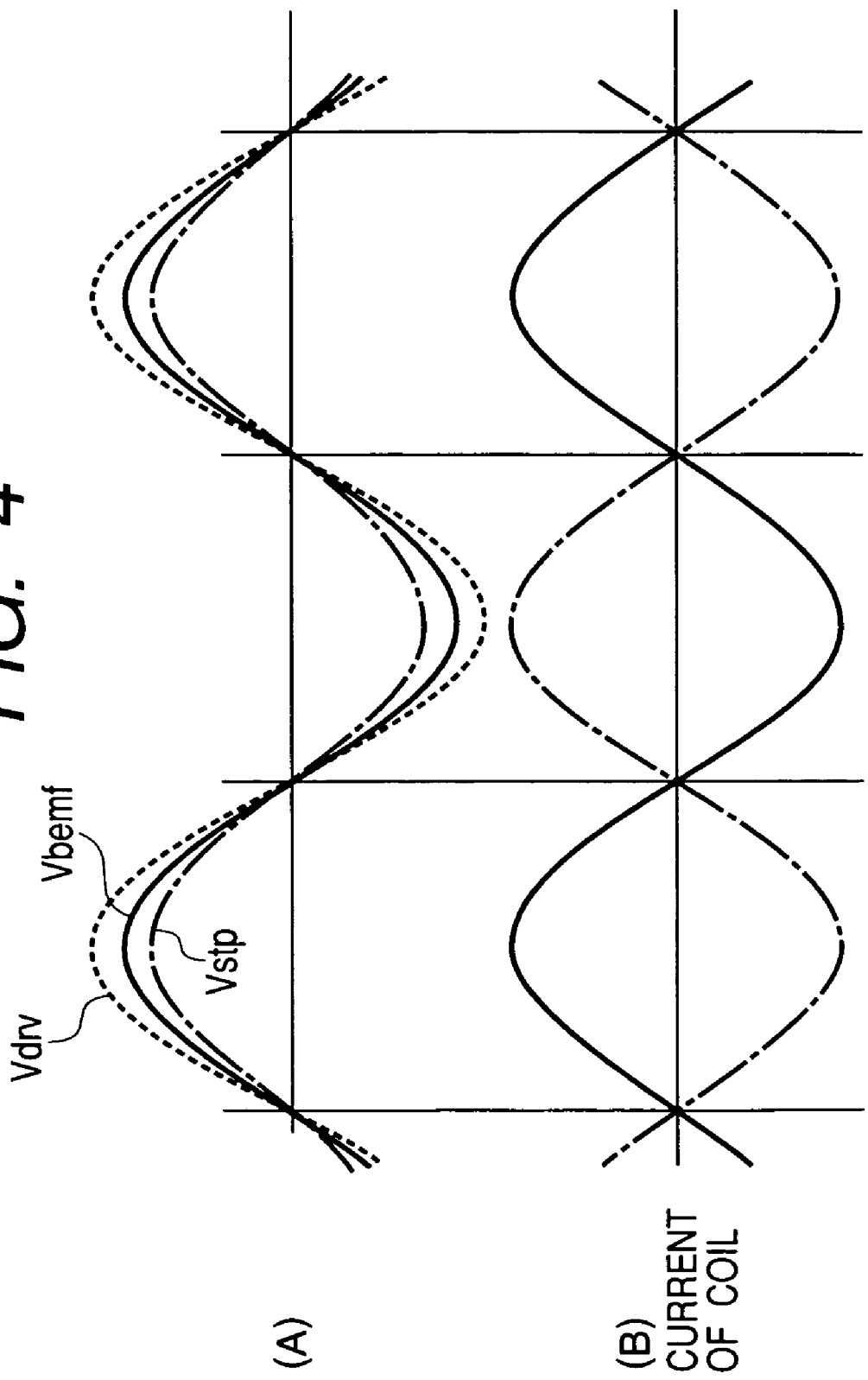
FIG. 4 is a waveform diagram showing the relationship among a coil back electromotive force, coil applied voltages and coil currents when a spindle motor is rotatably driven by the motor drive control circuit employed in the embodiment and a stepup converter is operated thereby.

In the three-phase brushless motor, a drive voltage Vdrv having amplitude larger than that of a back electromotive voltage Vbemf developed in each coil of the motor is applied to the coil as indicated by a broken line in synchronism with the back electromotive voltage Vbemf as shown in FIG. 4(A) to cause such a current as indicated by a solid line of FIG. 4(B) to flow therethrough. It is thus possible to develop positive torque in the motor. On the other hand, when a drive voltage Vstp having amplitude smaller than that of the back electromotive voltage Vbemf as indicated by an alternate long and short dash line in FIG. 4(A) is applied to the coil to cause such a backward current as indicated by an alternate long and short dash line in FIG. 4(B), the motor is brought to a regenerative brake state, thus making it possible to activate the motor as a boost or stepup converter. When a voltage Vstp reduced in amplitude by such a level as to allow a motor's backward current balanced with a consumed load current to always flow from a power supply line Vspn with respect to the back electromotive voltage Vbemf is applied upon this boost operation, the generated boost voltage can be kept constant even if the number of revolutions of the motor is reduced. Incidentally, since the output transistors M1 through M6 are PWM-controlled in the present embodiment, the spindle motor is operated in such a manner that voltages obtained by respectively reducing the average values of voltages outputted from the output transistors M1 through M6 each turned on and off by a drive pulse, from the back electromotive voltage Vbemf by a predetermined ratio are applied thereto.

Figure 5:
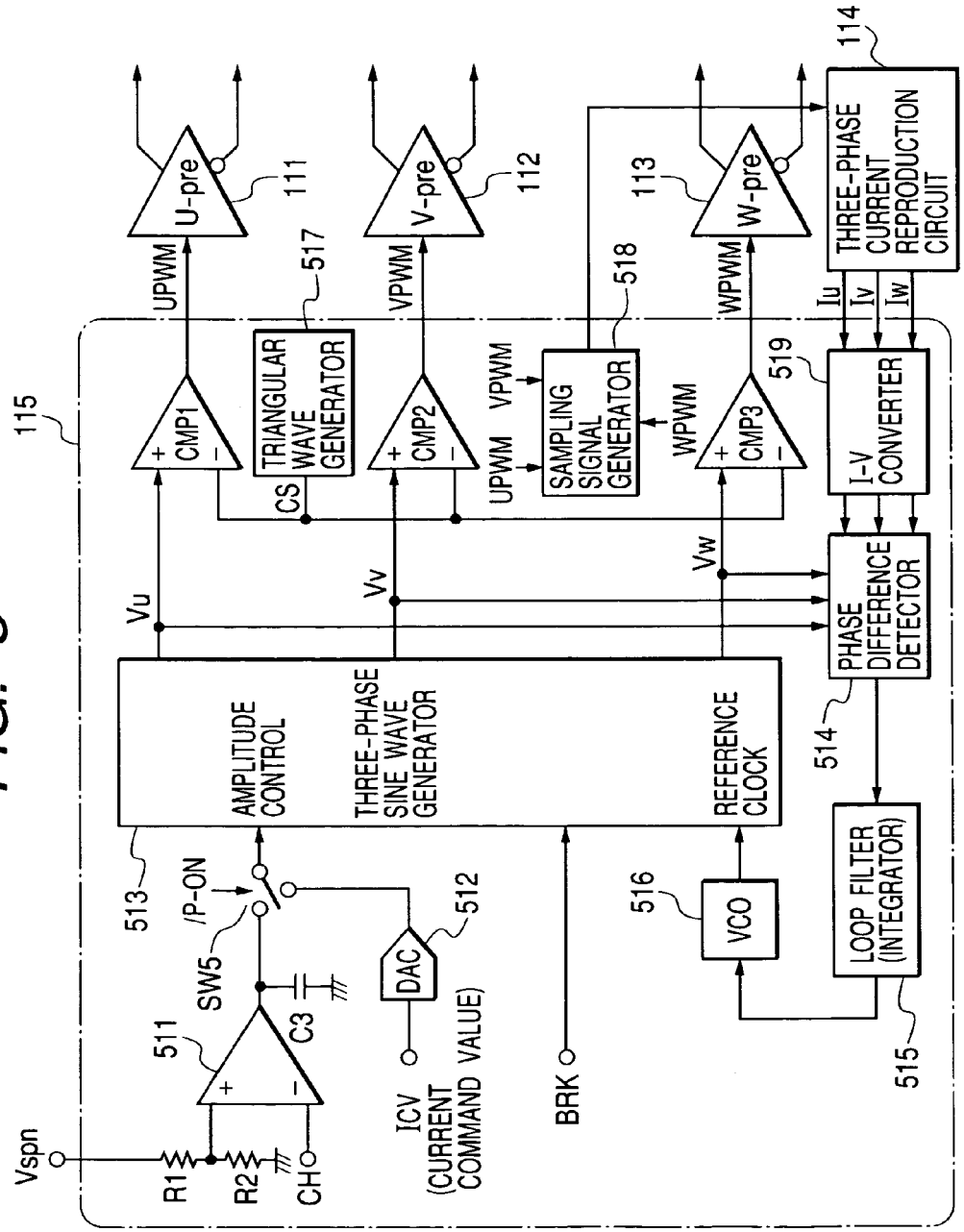
FIG. 5 is a block diagram illustrating a configurational example of a control circuit which effects PWM control at a normal operation and stepup converter control at power shutdown.

FIG. 5 shows a configurational example of the control circuit 115 which performs PWM control at the normal operation and stepup converter control at the power shutdown.

The control circuit 115 includes an error amplifier 511 which amplifies the difference in potential between a voltage obtained by resistance-dividing the power supply voltage Vspn by resistors R1 and R2 and a control input voltage CH supplied from the controller 260, a DA converter 512 which converts a current command value ICV supplied from the controller 260 into an analog signal, a switch SW5 which selects an output signal of the error amplifier 511 or the DA converter 512, based on a power on detect signal P-ON, a three-phase sine wave generator 513 which generates three-phase sine waves Vu, Vv and Vw each having amplitude corresponding to the signal inputted via the switch SW5 and whose electrical angles are shifted 120° by 120° from one another, a current-voltage converter 519 which converts reproduction currents Iu, Iv ad Iw generated by the three-phase current reproduction circuit 114 into voltages, a phase difference detector 514 which detects a phase difference between each of the sine waves Vu, Vv and Vw outputted from the three-phase sine wave generator 513 and each of the reproduction currents Iu, Iv and Iw, a loop filter (integral capacitor) 515 which generates a voltage corresponding to the detected phase difference, and a voltage-controlled oscillator (VCO) 516 which oscillates with a frequency corresponding to the voltage of the filter. An oscillation signal produced from the VCO 516 is supplied to the three-phase sine wave generator 513 as a reference clock, whereby the three-phase sine wave generator 513 is configured so as to output sine waves Vu, Vv and Vw equivalent in phase difference to zero with respect to the reproduction currents Iu, Iv and Iw respectively. A capacitor C3 connected to an output terminal of the error amplifier 511 is a phase compensating capacitor for prevention of oscillations.

Further, the control circuit 115 employed in the present embodiment also includes a triangular wave generator 517 which generates a triangular wave carrier signal having a frequency higher than about 100 times the frequency of each of the sine waves Vu, Vv and Vw, comparators CMP1, CMP2 and CMP3 which respectively compare the sine waves Vu, Vv and Vw and the triangular wave carrier signal generated by the triangular wave generator 517 and thereby generate PWM control signals UPWM, VPWM and WPWM with respect to the preamplifiers 111 through 113, a sampling signal generator 518 which generates a sampling signal SH for the three-phase current reproduction circuit 114, based on the control signals UPWM, VPWM and WPWM generated by the comparators CMP1, CMP2 and CMP3 and the like, etc.

Incidentally, the three-phase current reproduction circuit 114 may be one which generates sine waves by a so-called two-phase modulation scheme wherein a signal corresponding to the lowest-level phase of three phases is fixed to a low level only during such a period, as an alternative to the generation of the complete sine waves used as the three sine waves Vu, Vv and Vw whose phases are shifted by 120° from one another.

Figure 6:
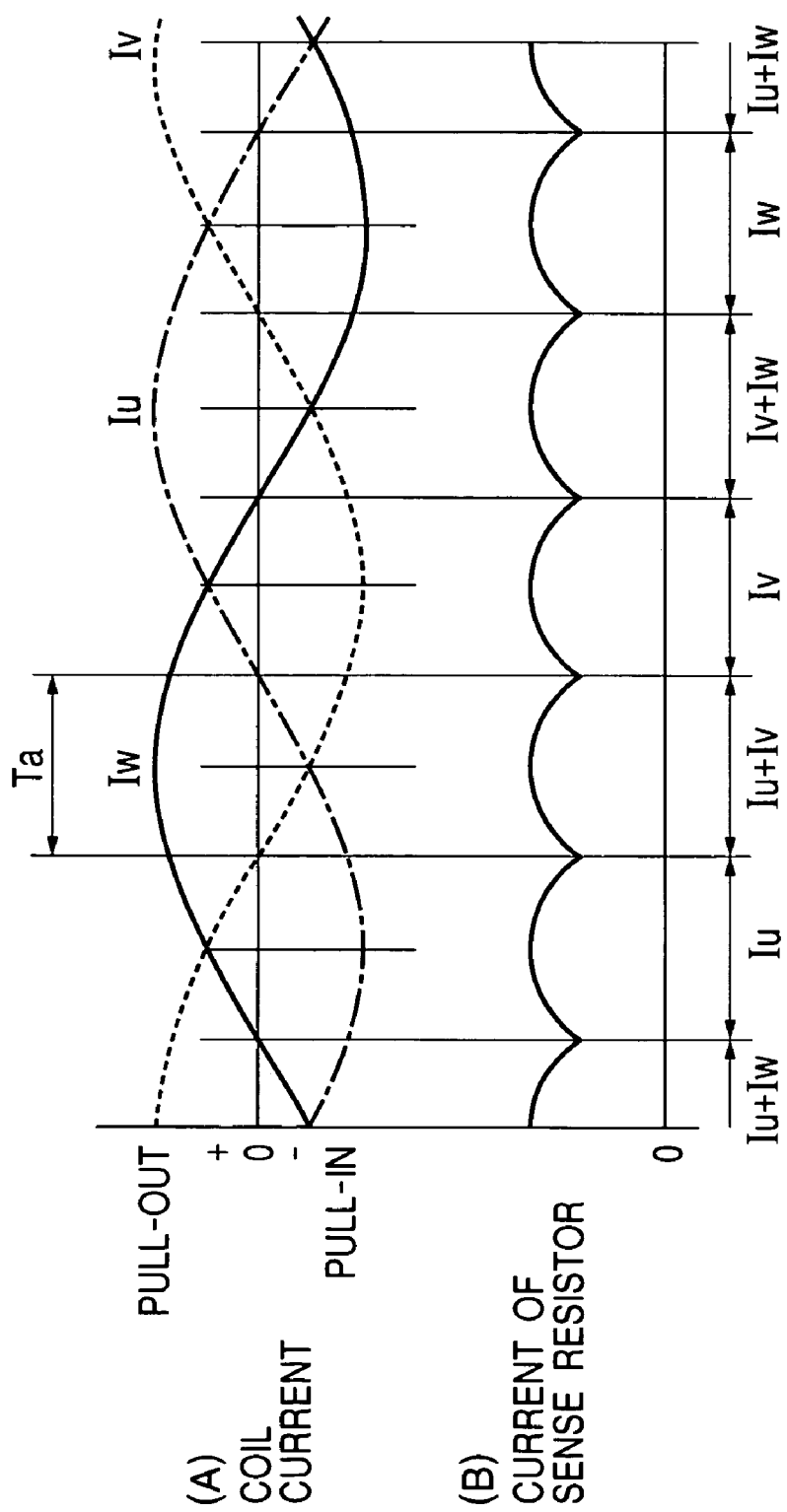
FIG. 6 is a waveform diagram showing the relationship between currents flowing through respective coils of the spindle motor and a current flowing through a sense resistor thereof.

The three-phase current reproduction circuit 114 will now be explained. In the three-phase brushless motor, the currents Iu, Iv and Iw that flow through the coils Lu, Lv and Lw for the respective phases, change in the form of sine waves displaced 120 electrical degrees with respect to one another as shown in FIG. 6(A). At this time, a current Isns that flows through the sense resistor Rsns shown in FIG. 2 is a current which flows into a ground point through each of the output transistors M4, M5 and M6 of the driver circuit 110 and corresponds to one obtained by adding negative currents at respective sections in FIG. 6(A). Therefore, the current changes as shown in FIG. 6(B). Incidentally, FIG. 6(B) shows the current that tries to flow from each coil to the ground point. When each of the output transistors M4, M5 and M6 is turned on, such a current flows through the sense resistor Rsns. Since, however, the output transistors M4, M5 and M6 are PWM-controlled as described above with respect to the spindle motor employed in the present embodiment, the current that actually flows through the sense resistor Rsns is different from a waveform shown in FIG. 6(B).

Since the PWM-controlled output transistors M4, M5 and M6 are respectively different in control pulse from one another, the current that flows through the sense resistor Rsns during a section Ta of FIG. 6(B) is equivalent to the sum (Iu+Iv) of a pull-in current Iu from the coil Lu for the U phase and a pull-in current Iv from the coil Lv for the V phase where attention is given to the section Ta of FIG. 6(B) by way of example. However, when a certain instant in the section Ta is taken, a period exists in which either one of the U-phase driving transistor M4 and the V-phase driving transistor M5 is held on and the other thereof is held off.

Thus, if the voltage into which the current Isns that flows through the sense resistor Rsns is converted, is sampled with the aim of capturing its instant, then a current value of one phase (e.g., Iu) can be recognized. When the instant at which the sum (Iu+Iv) of pull-out currents for the two phases is flowing, is taken and currents are sampled, the sum thereof is equal to a current that flows into the coil for the W phase. Therefore, a current Iw flowing through the coil for the W phase can be recognized. If the coil current Iu for the U phase and the coil current Iw for the W phase are recognized in the above-described manner, then a coil current Iv for the remaining V phase can be determined as Iw-Iu by calculation.

The three-phase current reproduction circuit 114 employed in the embodiment is configured so as to reproduce each of the three-phase currents Iu, Iv and Iw which change as shown in FIG. 6(A), from the current Isns flowing through the sense resistor Rsns by the above-described method. Incidentally, since the current reproduction circuit for reproducing the currents flowing through the coils of such a three-phase motor can be configured using the known technology disclosed in Japanese Unexamined Patent Publication No. 2002-119062 and the like, its detained description will be omitted.

Figure 7:
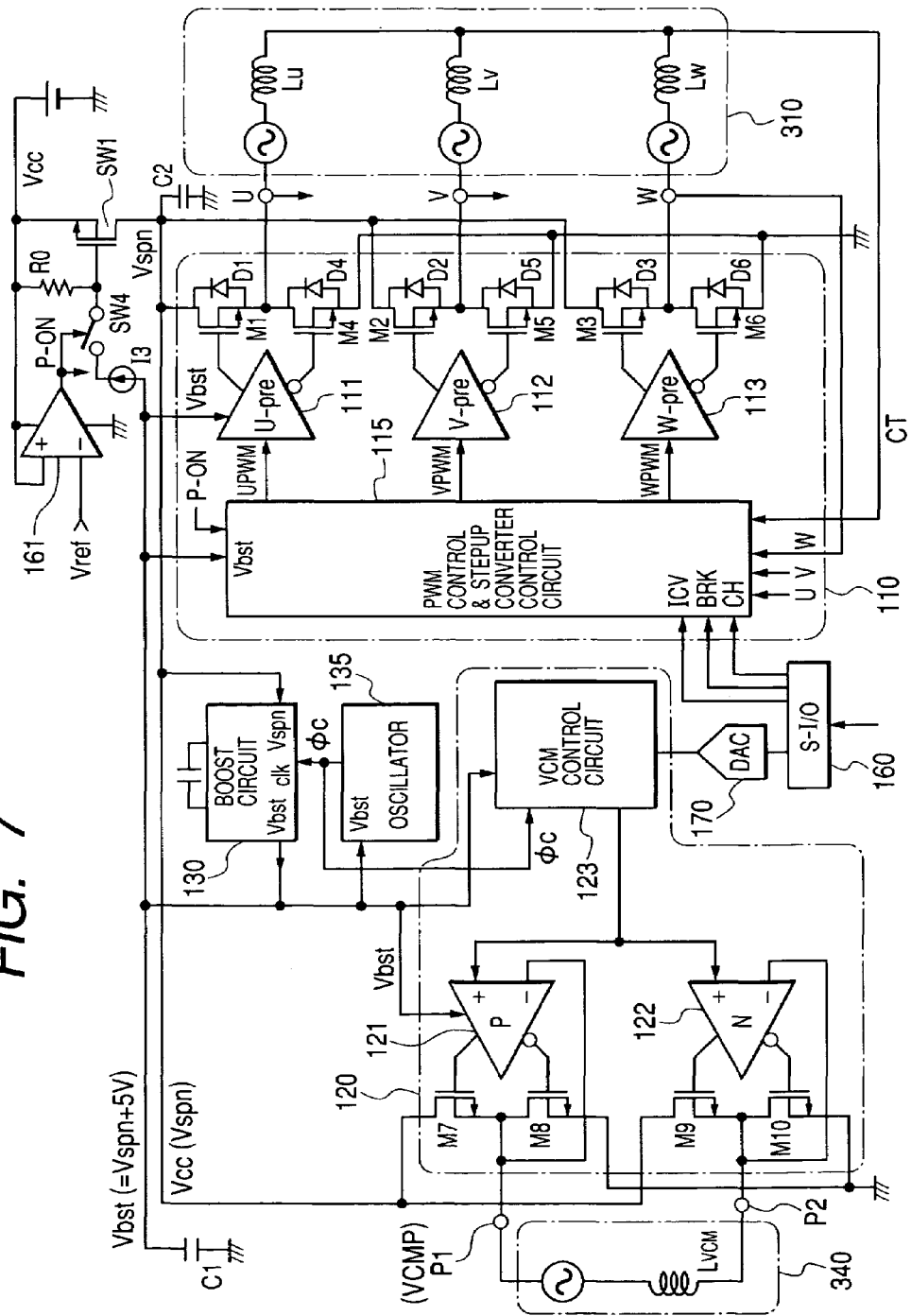
FIG. 7 is a block diagram depicting another configurational example of a motor drive control circuit.

FIG. 7 shows another configurational example of the motor drive control circuit 100 shown in FIG. 1. The regulator 140, the power supply monitor 150, the back electromotive voltage detector 180 and the AD converter 190 shown in FIG. 1 are not illustrated in FIG. 7. As an alternative to the provision of the current sense resistor Rsns and three-phase reproduction circuit 114 employed in the motor drive control circuit 100 of the first embodiment (see FIG. 2), the motor drive control circuit 100 according to the present embodiment is one wherein voltages U, V and W at terminals of respective coils and a voltage CT at a center tap are supplied to a control circuit 115 to detect zero crossing points of back electromotive voltages, thereby determining timings for applying voltages to the coils for the respective phases to drive and control a spindle motor 310. The present embodiment has an advantage in that the present motor drive control circuit 100 can be reduced in circuit scale as compared with the motor drive control circuit 100 according to the embodiment of FIG. 2.

Figure 8:
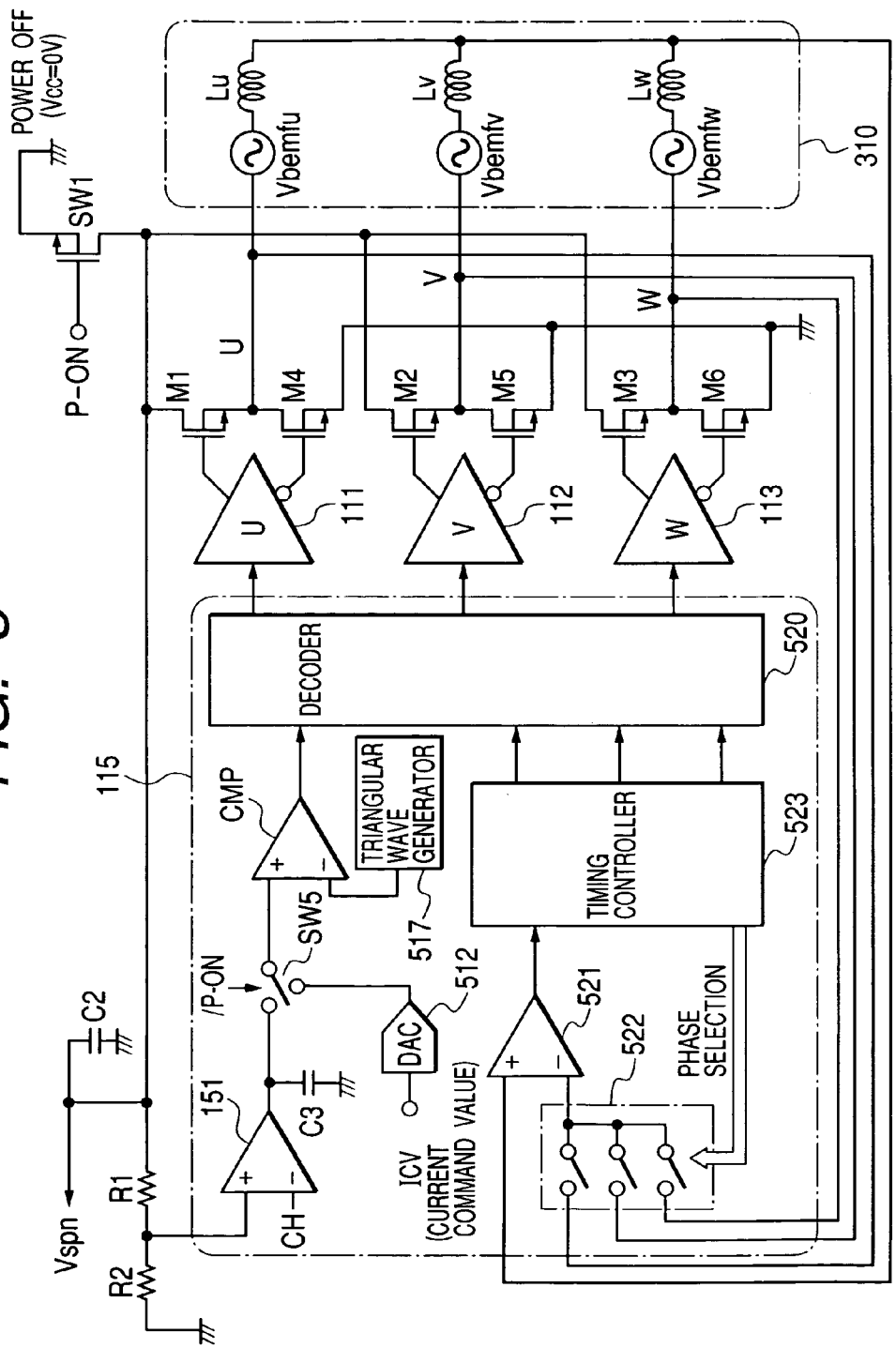
FIG. 8 is a block diagram showing a more specific configurational example of a control circuit 115 which constitutes the motor drive control circuit 100 employed in the second embodiment shown in FIG. 7.

FIG. 8 shows a more specific configurational example of the control circuit 115 which constitutes the motor drive control circuit 100 according to the second embodiment. Incidentally, the same circuits and elements as those in FIG. 5 are respectively identified by the same reference numerals in FIG. 8, and the description of certain common ones will therefore be omitted.

As shown in FIG. 8, the control circuit 115 of the present embodiment is provided, in place of the three-phase sine wave generator 513, with a circuit (called decoder in the present embodiment) 520. The circuit 520 supplies a PWM control signal outputted from a comparator CMP for comparing an output of an error amplifier 511 for amplifying a difference voltage between a voltage Vspn boosted by the spindle motor 310 upon power shutdown and a control input voltage CH supplied from the controller 260 or a voltage obtained by DA-converting a current command value ICV supplied from the controller 260 by a DA converter 512 upon a normal operation with a carrier signal outputted from a triangular wave generator 517, to any of preamplifiers 111 through 113 for U, V and W phases or selects it therefor. Further, the circuit 520 generates and supplies signals for fixing the outputs of the preamplifiers corresponding to the phases paired with the phases supplied with the PWM control signal according to two coils through which currents flow, and a signal for bringing the output of the preamplifier corresponding to the remaining coil to high impedance (bringing two output transistors to an off state together).

Also the control circuit 115 of the present embodiment is provided with a comparator 521 which compares a voltage CT at a center tap among the respective coils Lu, Lv and Lw of the spindle motor 310 and voltages U, V and W at terminals of the respective coils to detect zero crossing points of back electromotive voltages, a selector 522 which selects any one of the voltages U, V and W at the terminals of the respective coils and supplies it to the comparator 521, and a timing controller 523 which generates a phase select signal for controlling the selector 522, based on the output of the comparator 521, and phase switching timing signals for the decoder 520.

The selector 522 is controlled so as to select a de-energized phase of the respective phase coils and input it to the comparator 521. Here, the corresponding preamplifier in which the back electromotive voltage corresponds to the coil for the de-energized phase, of the respective phase coils, is controlled by the decoder 520 such that its output is brought to high impedance. Thus, each of the back electromotive voltages of the coils unaffected by the output voltages of the preamplifiers is supplied to the comparator 521 to thereby make it possible to accurately detect zero crossing points.

Even in the present embodiment in a manner similar to the above embodiment, the control circuit 115 performs such control as to apply drive voltages each having amplitude larger than that of each of the back electromotive voltages developed in the motor's coils to the coils in synchronism with the back electromotive voltages upon normal rotation to thereby generate positive torque in the motor and to apply drive voltages each having amplitude smaller than that of each of the back electromotive voltages to the coils in synchronism with the back electromotive voltages upon power shutdown to supply currents in the direction opposite to those at the normal operation, thereby operating the motor as a boost or stepup converter.

Incidentally, at this time, the output transistors M1 through M6 are turned on/off by PWM drive pulses so that the spindle motor is operated in such a manner that the average values of voltages outputted from the output transistors M1 through M6 are respectively reduced from the back electromotive voltages by a predetermined ratio. Thus, it is possible to generate voltages higher than the voltages rectified by the body diodes D1 through D6 of the output transistors M1 through M6 upon power shutdown. As a result, even if the power shutdown occurs upon head loading in which the spindle motor 310 is rotated at low speed, the spindle motor 310 is operated as a stepup converter to generate boosted voltages of the back electromotive voltages, thereby making it possible to retract the magnetic head safely.

While the invention made above by the present inventors has been described specifically based on the illustrated embodiments, the present invention is not limited to the embodiments. It is needless to say that various changes can be made thereto within the scope not departing from the substance thereof. While the above embodiment has described the case in which the present invention is applied to the system using the magnetic head called vacuum slider, for example, the present invention may be applied to a system using a normal magnetic head. In the present embodiment, the ramp used as a standby position is provided outside the disk, and the magnetic head is retracted to the ramp upon power shutdown. However, the present invention can be applied even to the case in which the standby position is provided inside the disk and the magnetic head is retracted and moved inside the disk upon power shutdown.

Further, while the above embodiment has shown the configuration in which the DA converters for converting the current command value of the spindle motor and the current command value of the voice coil motor both supplied from the controller 260 into the digital signals are separately provided, one DA converter can be shared by using it with a time-sharing system. While the present embodiment has described that the control input voltage CH is given as the analog voltage, the control input voltage CH is also supplied to the DA converter as a digital signal, where it may be converted into an analog value. Further, an AD converter is provided at a stage prior to the error amplifier 511, and a digital comparator for making a comparison with the control input voltage after being converted into digital form may be provided. In this case, a digital filter is used in place of the phase compensating capacitor C3. Each of a triangular wave generator and a PWM modulator based on a comparator to be described later will also be constituted by a digital circuit.

In the above embodiment, the voltages each having the amplitude smaller than that of each of the back electromotive voltages are applied to the coils of the first motor in synchronism with the back electromotive voltages developed in the coils of the spindle motor to carry out the stepup converter operation. However, the stepup converter operation may be performed in the following manner.

Figure 9:
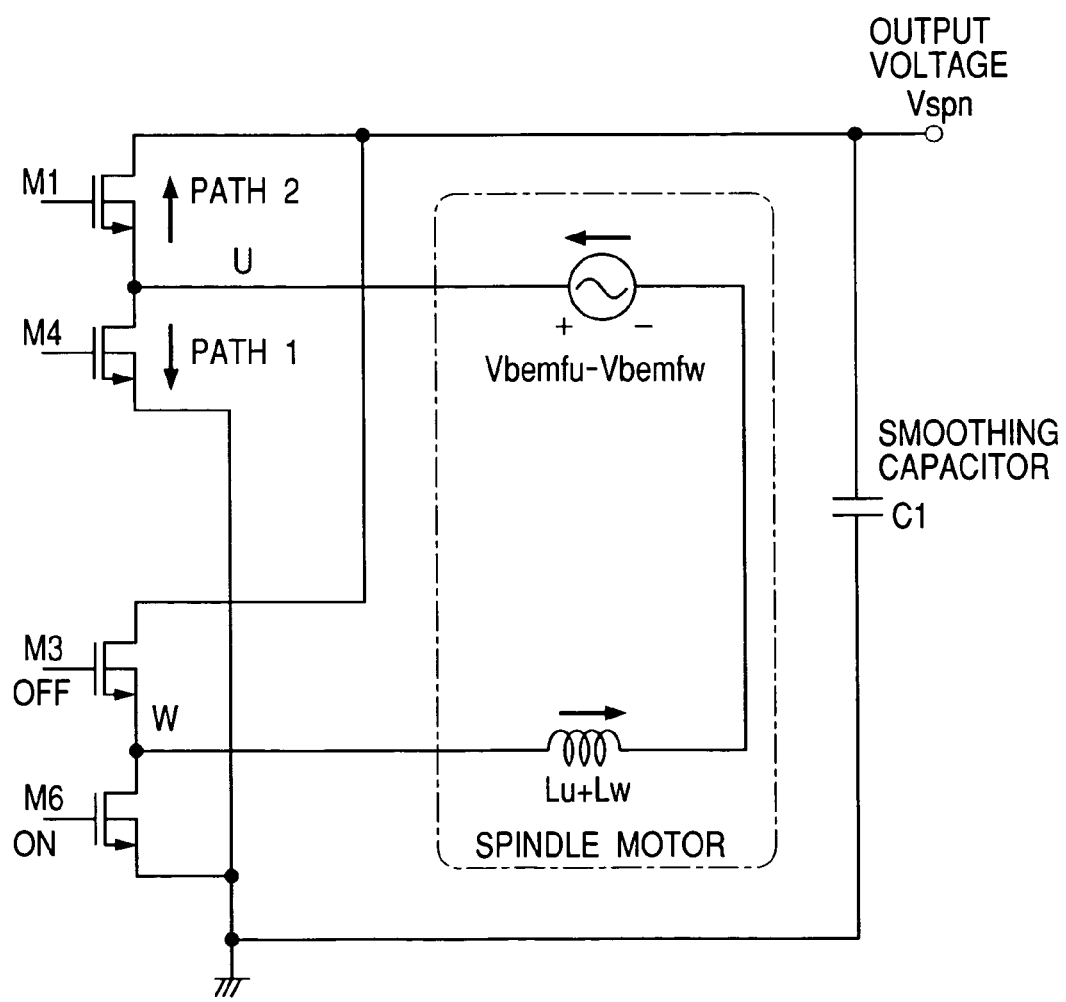
FIG. 9 is a circuit diagram illustrating a stepup converter and elements constituting it where attention is given to a certain instant of a spindle motor.

FIG. 9 shows a configuration of an AC-DC stepup converter which regards each of back electromotive voltages (B-EMF) developed by rotation of a three-phase motor as a three-phase AC source, and power-converts it into a DC voltage Vspn by operating an output stage of the three-phase motor. For the simplification of description, let's consider a triphasic operation as superimposition of a behavior based on a U-phase back electromotive voltage and a V-phase back electromotive voltage, a behavior based on the V-phase back electromotive voltage and the U-phase back electromotive voltage, and a behavior based on a W-phase back electromotive voltage and the V-phase back electromotive voltage. The same figure shows only the behavior based on the U-phase back electromotive voltage and the W-phase back electromotive voltage. Now consider where current flows from a (−) terminal side to a (+) terminal side of a back electromotive voltage (Vbemfu-Vbemfw). This is made possible by applying a PWM-modulated sine wave having amplitude smaller than that of a back electromotive voltage in synchronism with the back electromotive voltage as previously described in FIG. 4.

When M3 is held OFF, M6 is held ON, M4 is held ON, and M5 is held OFF in FIG. 9, (Vbemfu-Vbemfw) is short-circuited to GND by M4 and M6 so that the current is returned to the GND side as indicated by a path 1. Hence a current value of a coil inductor (Lu+Lw) increases so that energy is stored therein. Next, when M1 is turned from OFF to ON and M4 is turned from ON to OFF, the energy stored in the coil is discharged to the output voltage side through M1 as indicated by a path 2. A smoothing capacitor C1 is charged by the current discharged at this time to thereby make it possible to step up the output voltage Vspn.

If the amplitude larger than that of the back electromotive voltage is given, then the current that flows through the inductor Lu+Lw proceeds from the (+) terminal side of the back electromotive voltage (Vbemfu-Vbemfw) to the (−) terminal side thereof. In this case, the operation of pulling out the charge from the smoothing capacitor C1 is made upon operation of the path 2 in which M1 is turned ON, so that the output voltage Vspn cannot be boosted. Thus, it is essential that a drive voltage smaller in amplitude than the back electromotive voltage (Vbemfu-Vbemfw) should be always applied in order to enable the stepup operation.

Although the operation based on the U-phase and W-phase back electromotive voltages has been explained in FIG. 9, the back electromotive voltage (Vbemfu-Vbemfw), the coil inductor (Lu+Lw), and the MOS transistors M1, M4, M3 and M6 may be considered to be replaced with (Vbemfv-Vbemfu), (Lv+Lu), and M2, M5, M1 and M4, respectively, in the case of the V phase and the U phase. Further, when the W and V phases are taken, the back electromotive voltage (Vbemfu-Vbemfw), the coil conductor (Lu+Lw), and the MOS transistors M1, M4, M3 and M6 may be considered to be replaced with (Vbemfw-Vbemfv), (Lw++Lv), and M3, M6, M2 and M5 respectively. The total boost operation is achieved by adding boost converter operations in the three cases.

Eventually, the output transistors M5, M6 and M4 used as switching elements are turned on and off with suitable timings to enable the output of the boosted voltages through the respective coils. It is understood that since the MOS transistors are used as all commutating switch elements without being used as diodes upon the operation of FIG. 9, the motor can be operated as a stepup converter which enables a stepup operation and is free of a loss corresponding to a forward voltage of each diode.

While the above description has principally been made of the case in which the invention made by the present inventors is applied to the hard disk storage system which belongs to the field of application reaching the background of the invention, the present invention is not limited to it. The present invention can be widely used in a disk type storage system and a playback system.

Advantageous effects obtained by a representative one of the inventions disclosed in the present application will be described in brief as follows:

Even when a power supply is shut off when the rotation of a spindle motor is slow in a magnetic disk storage system, a voice coil motor is driven by a voltage obtained by boosting a back electromotive force of the spindle motor to make it possible to reliably retract a magnetic head. As a result, an advantage is obtained in that a high-reliable magnetic disk storage system using a vacuum slider, which is capable of high-density recording, can be realized which is able to lower the rotation of the spindle motor to thereby load and unload the magnetic head safely and to move the magnetic head to a standby position in safety even when the power supply is shut off during loading.

What is claimed is:

1. A magnetic disk storage system comprising:
a first motor which rotates a magnetic disk;
a first motor drive circuit which rotatably drives the first motor;
a magnetic head which reads information on a storage track on the magnetic disk and is adapted to make smaller a gap between the magnetic head and a surface of the magnetic disk as the rotational speed of the first motor increases;
a second motor which moves the magnetic head above the magnetic disk;
a boost circuit which boosts a voltage which is generated by rectifying a first back electromotive force of the first motor, so as to generate a first voltage when a first power supply to the magnetic disk storage system is interrupted;
a second motor drive circuit which drives the second motor in accordance with a control of a drive control circuit by using the first voltage as a second power supply to the second motor drive circuit when the first power supply to the magnetic disk storage system is interrupted;
a central processing unit which supplies the drive control circuit with a first current command value for the second motor drive circuit by using the voltage as a third power supply to the central processing unit so as to perform a retract control, said retract control including shifting the magnetic head to a standby position when the first power supply to the magnetic disk storage system is interrupted; and
the drive control circuit which controls the second motor drive circuit in accordance with the first current command value by using the first voltage as the second power supply to the drive control circuit when the first power supply to the magnetic disk storage system is interrupted.

2. The magnetic disk storage system according to claim 1, wherein when the first power supply to the magnetic disk storage system is interrupted, the drive control circuit causes the first motor drive circuit to perform a stepup converter operation by the drive control circuit supplying the first motor drive circuit with each of drive voltages having an amplitude value which is smaller than a value of the first back electromotive force of each of three phases of the first coil and is synchronized with the first back electromotive force of each of three phases of the first coil, so as to generate the voltage.

3. The magnetic disk storage system according to claim 2, wherein when the first power supply to the magnetic disk storage system is interrupted and the second motor drive circuit has shifted the magnetic head to the standby position, the first motor drive circuit stops a rotation of the first motor by the drive control circuit controlling the first motor drive circuit in accordance with the central processing unit supplying the drive control circuit with an instruction signal for stopping the rotation of the first motor.

4. The magnetic disk storage system according to claim 3, wherein, when the magnetic head is loaded from the standby position to the surface of the magnetic disk, the drive control circuit makes a rotational speed of the first motor slower than a rotational speed of the first motor at normal operations which includes a seek operation for shifting the magnetic head to a predetermined storage track, wherein when the normal operations are performed, the drive control circuit controls a rotational speed of the first motor in accordance with a second current command value for the first motor drive circuit from the central processing unit by supplying the first motor drive circuit with each of drive voltages having an amplitude value which is higher than a value of the first back electromotive force of each of three phases of the first coil and is synchronized with the first back electromotive force of each of three phases of the first coil.

5. The magnetic disk storage system according to claim 3, wherein the drive control circuit includes an error amplifier which amplifies a potential difference between the voltage generated by the stepup converter operation of the first motor and a predetermined control voltage, and the drive control circuit applies each of the drive voltages corresponding to an output of the error amplifier to the first motor drive circuit when the first power supply to the magnetic disk storage system is interrupted, to thereby allow the first motor drive circuit to perform the stepup converter operation.

6. The magnetic disk storage system according to claim 5, further comprising a circuit, wherein the second current command value is a digital value, the circuit is provided which reproduces currents flowing through the respective phase coils of the first motor to respectively proportional values to phase coil currents of three phases of the first motor from a voltage value detected by a resistor, and the drive control circuit applies a voltage corresponding to a comparison result between the second current command value and each of the currents reproduced values to the first motor drive circuit when normal operations, which includes a seek operation for shifting the magnetic head to a predetermined storage track, is performed and applies a voltage corresponding to the output of the error amplifier to the first motor drive circuit when the first power supply to the magnetic disk storage system is interrupted.

7. The magnetic disk storage system according to claim 1, wherein the first motor drive circuit includes transistors that cause currents to flow through the first coils of the first motor, and the drive control circuit carries out on/off-control of the transistors according to a pulse width control.

8. The magnetic disk storage system according to claim 7, wherein when normal operations, which includes a seek operation for shifting the magnetic head to a predetermined storage track, is performed, the boost circuit boosts a source voltage of the magnetic disk storage system to generate the first voltage supplied to the first motor drive circuit, the second motor drive circuit and the device control circuit.

9. The magnetic disk storage system according to claim 1, further comprising a back electromotive force phase detecting circuit which detects the first back electromotive voltage induced in each of three phase of the first coil of the first motor so as to determine an energized phase coil of the first motor, wherein the first motor drive circuit is driven in accordance with a detection result of the back electromotive force phase detecting circuit.

10. The magnetic disk storage system according to claim 1, wherein when normal operations which includes a seek operation for shifting the magnetic head to a predetermined storage track is performed, the central processing unit supplies the drive control circuit with a second current command value for the first motor drive circuit and the first current command value and controls the magnetic disk storage system and the drive control circuit controls the first motor drive circuit and the second motor drive circuit in accordance with the first and second command values.

11. A magnetic disk storage system comprising:
a first motor which rotates a magnetic disk;
a first motor drive circuit which rotatably drives the first motor;
a magnetic head which reads information on a storage track on the magnetic disk and is adapted to make smaller a gap between the magnetic head and a surface of the magnetic disk as the rotational speed of the first motor increases;
a second motor which moves the magnetic head above the magnetic disk;
a boost circuit which boosts a voltage which is generated by rectifying a first back electromotive force of the first motor, so as to generate a first voltage when a first power supply to the magnetic disk storage system is interrupted;
a second motor drive circuit which drives the second motor in accordance with a control of a drive control circuit by using the first voltage as a second power supply to the second motor drive circuit when the first power supply to the magnetic disk storage system is interrupted;
a central processing unit which supplies the drive control circuit with a first current command value for the second motor drive circuit by using the voltage as a third power supply, so as to perform a retract control, said retract control including shifting the magnetic head to a standby position when the first power supply to the magnetic disk storage system is interrupted; and
the drive control circuit which controls the second motor drive circuit in accordance with the first current command value by using the first voltage as the second power supply to the drive control circuit when the first power supply to the magnetic disk storage system is interrupted, wherein, when the magnetic head is loaded from the standby position to the surface of the magnetic disk, the drive control circuit makes a rotational speed of the first motor slower than a rotational speed at the time that the magnetic head moves above the surface of the magnetic disk.

12. The magnetic disk storage system according to claim 11, wherein the normal operations includes an operation for fixing the magnetic head to a prescribed storage track thereof, and wherein the standby position is outside of the magnetic disk.

13. A magnetic disk storage system comprising:
a first motor which rotates a magnetic disk;
a first motor drive circuit which drives the first motor;
a second motor which moves the magnetic head;
a second motor drive circuit which drives the second motor;
a magnetic head being adapted to make smaller a gap between the magnetic head and a surface of the magnetic disk as a rotational speed of the first motor increases; and
a central processing unit which controls the first motor drive circuit and the second motor drive circuit by using a voltage which is generated by rectifying a first back electromotive force of the first motor so as to perform a retract control, said retract control including shifting the magnetic head to a standby position when a first power supply to the system is interrupted.

14. The magnetic disk storage system according to claim 13, wherein when the first power supply to the system is interrupted and the second motor drive circuit has shifted the magnetic head to the standby position, the first motor drive circuit stops a rotation of the first motor in accordance with an instruction signal for stopping the rotation of the first motor from the central processing unit.

15. The magnetic disk storage system according to claim 13, wherein, when the magnetic head is loaded from the standby position to the surface of the magnetic disk, the drive control circuit makes a rotational speed of the first motor slower than a rotational speed of the first motor at normal operations which include a seek operation for shifting the magnetic head to a predetermined storage track, and wherein when the normal operations are performed, the central processing unit controls a rotational speed of the first motor.

16. The magnetic disk storage system according to claim 13, wherein the first motor drive circuit includes transistors that cause currents to flow through first coils of the first motor and carries out on/off-control of the transistors according to a pulse width control.

17. The magnetic disk storage system according to claim 13, further comprising a back electromotive force phase detecting circuit which detects a first back electromotive voltage of the first motor induced in each of three phase of first coils of the first motor so as to determine an energized phase coil of the first motor, wherein the first motor drive circuit is driven in accordance with a detection result of the back electromotive force phase detecting circuit.

18. The magnetic disk storage system according to claim 13, further comprising a boost circuit which boosts the voltage to generate a boost voltage to be supplied to the first motor drive circuit and the second motor drive circuit when the first power supply to the system is interruption.

* * * * *